US010772348B2

(12) United States Patent
Asante et al.

(10) Patent No.: US 10,772,348 B2
(45) Date of Patent: Sep. 15, 2020

(54) APPARATUS FOR PRODUCTION OF SNACK FOOD PELLETS

(71) Applicant: Frito-Lay North America, Inc., Plano, TX (US)

(72) Inventors: Samuel Asiedu Asante, Allen, TX (US); Rudolph L. Bazaldua, Midlothian, TX (US); Sonny Beckman, Kankakee, IL (US); Ajay Rajeshwar Bhaskar, Allen, TX (US); Bhima Geera, Kankakee, IL (US); Lori Glanz, Plano, TX (US); Nick Ladin, Kankakee, IL (US); V. N. Mohan Rao, Plano, TX (US); David L. Sanchez, Plano, TX (US); William Yang, Frisco, TX (US)

(73) Assignee: Frito-Lay North America, Inc., Plano, TX (US)

( * ) Notice: Subject to any disclaimer, the term of this patent is extended or adjusted under 35 U.S.C. 154(b) by 64 days.

(21) Appl. No.: 15/977,412

(22) Filed: May 11, 2018

(65) Prior Publication Data

US 2019/0343164 A1    Nov. 14, 2019

(51) Int. Cl.
*A21C 11/10* (2006.01)
*A23P 30/10* (2016.01)
(Continued)

(52) U.S. Cl.
CPC ............ *A23P 30/10* (2016.08); *A23P 30/20* (2016.08); *A23P 30/38* (2016.08); *A23V 2300/10* (2013.01); *A23V 2300/38* (2013.01)

(58) Field of Classification Search
CPC .......... A23P 30/20; A23P 30/38; A23P 30/10; A23V 2300/10; A23V 2300/38;
(Continued)

(56) References Cited

U.S. PATENT DOCUMENTS 1,882,160 A * 10/1932 Paris ..................... A21C 11/08
425/235
3,332,781 A   7/1967 Benson et al.
(Continued)

OTHER PUBLICATIONS

International Search Report and Written Opinion dated Jul. 10, 2019 for PCT application No. PCT/US2019/030601 (7 pages).

*Primary Examiner* — Seyed Masoud Malekzadeh
(74) *Attorney, Agent, or Firm* — Barnes & Thornburg LLP; G. Peter Nichols (57) ABSTRACT

An apparatus for separating a ribbon of uncooked embossed dough into separated pieces patterned/shaped like the embossed pattern. The apparatus includes a pair of spaced apart rollers for receiving a ribbon of dough there between. One of rollers has a pattern embossed on its surface to emboss the ribbon of dough with the pattern. The surface embossing and the spacing between the rollers maintains the structural integrity of the embossed ribbon of dough. The apparatus has a two spaced apart rotating arms to receive the embossed dough ribbon there between. A plurality of spaced apart fingers extend outward along the length of each of the arms and are configured to tear the dough, without sticking, into dough pieces reflecting shapes embossed in the dough ribbon. The dough pieces can be dried, and patterned shaped pieces are separated out for expansion to three dimensions by cooking.

6 Claims, 9 Drawing Sheets

(51) Int. Cl.
*A23P 30/38* (2016.01)
*A23P 30/20* (2016.01)

(58) Field of Classification Search
CPC ......... A21C 11/02; A21C 11/04; A21C 11/06; A21C 11/08; A21C 11/12; A21C 11/14
See application file for complete search history.

(56) References Cited

U.S. PATENT DOCUMENTS

| | | | | |
|---|---|---|---|---|
| 4,120,627 A * | 10/1978 | Abe | ......... | A23G 3/02 425/101 |
| 4,941,402 A * | 7/1990 | D'Alterio | ......... | A21C 9/066 425/112 |
| 5,024,719 A * | 6/1991 | Heck | ......... | A21C 11/00 101/8 |
| 5,240,731 A * | 8/1993 | Bornhorst | ......... | A21C 11/04 264/153 |
| 5,529,799 A | 6/1996 | Bornhorst et al. | | |
| 5,687,638 A * | 11/1997 | Makowecki | ......... | A21C 11/10 425/133.1 |
| 6,168,817 B1 | 1/2001 | Pavan | | |
| 6,174,556 B1 * | 1/2001 | Bornhorst | ......... | A21C 11/04 425/237 |
| 6,274,189 B1 * | 8/2001 | Kazemzadeh | ......... | A23P 30/20 426/425 |
| 6,432,463 B1 | 8/2002 | Bhaskar et al. | | |
| 9,271,523 B2 | 3/2016 | Williams et al. | | |
| 2003/0024360 A1 | 2/2003 | Ribble | | |
| 2005/0034581 A1 * | 2/2005 | Bortone | ......... | A23P 30/34 83/469 |
| 2011/0268840 A1 * | 11/2011 | McDonnell | ......... | A21B 5/00 426/19 |
| 2013/0202774 A1 * | 8/2013 | Barnett | ......... | A23P 30/34 426/634 |
| 2013/0209644 A1 * | 8/2013 | Miladinov | ......... | A23G 3/54 426/548 |

* cited by examiner

APPARATUS FOR PRODUCTION OF SNACK FOOD PELLETS

BACKGROUND OF THE INVENTION

1. Field of the Invention

This technology relates to the field of continuous processes for making snack foods, and more particularly to an apparatus and process for tearing a single or embossed ribbon of uncooked dough into discrete pieces for subsequent shaker-drying and separation of the pieces into patterned shapes from the embossing suitable for further processing into snack foods, and interstitial fragments from between embossed patterned pieces for recycling.

2. Description of the Related Art

Consumers have an appetite for novel snacks that have shapes that appeal to the aesthetic, and to the imagination, and that have desired organoleptic properties. The marketing of "three dimensional," as opposed to "flat," snacks has provided an opportunity. A three dimensional snack may be a one that has a shell of a particular three dimensional shape and that is hollow inside. For example, a spherical snack with a hollow interior.

Figure 1:
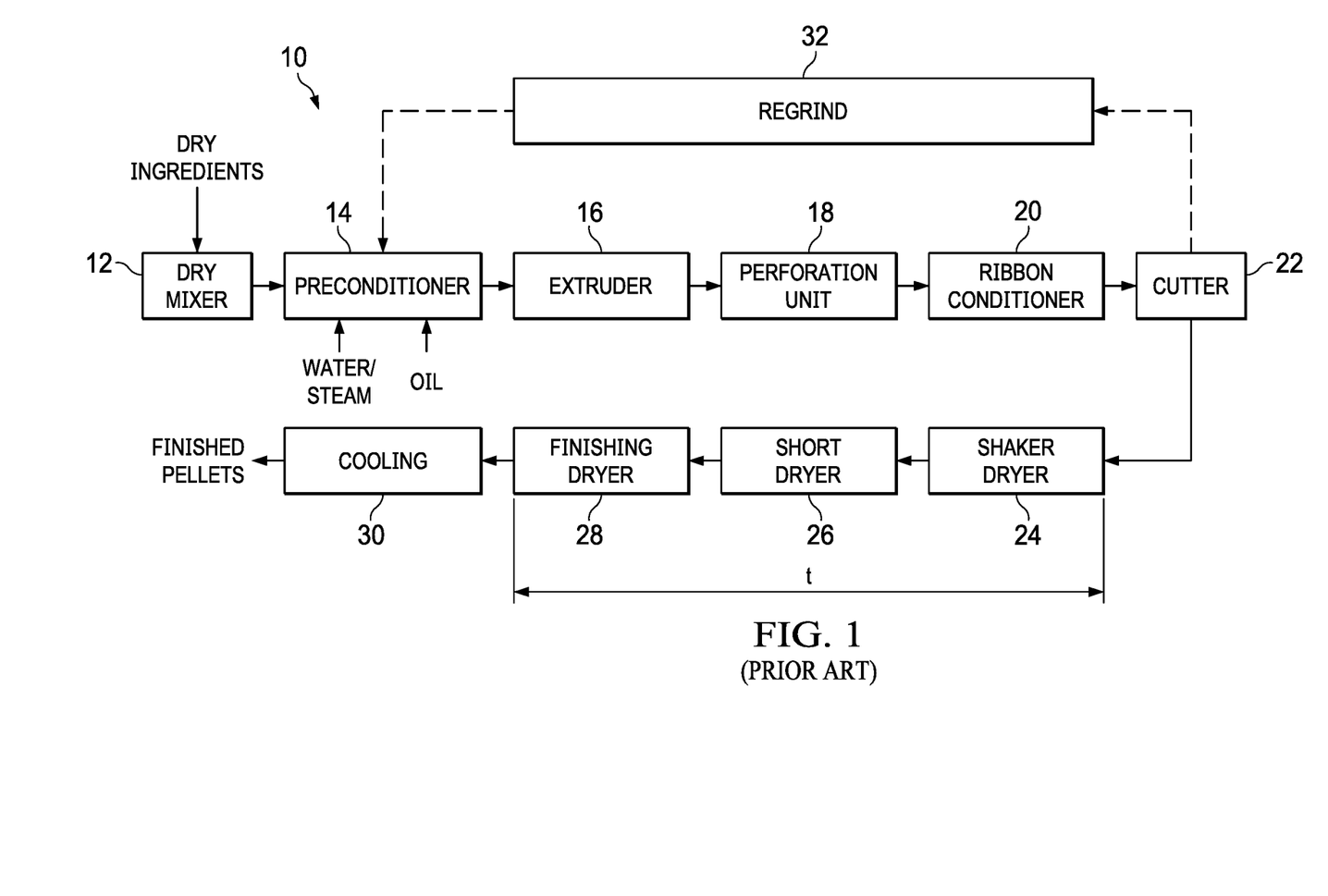
FIG. 1 is a block process flow diagram depicting the processing units in a typical prior art process making two dimensional dough pieces that are expandable into three dimensional snack food pieces.

Mass production of three dimensional snacks in a continuous process poses significant technical issues. Generally, a process 10 has been developed that includes the process steps shown in FIG. 1. Dry ingredients are added to a dry mixer 12 where the ingredients are mixed together, and are the transferred to a preconditioner 14 where a dough is formed of the ingredients, with water/steam and oil. The dough is charged to an extruder 16, and typically two extruded dough ribbons are extruded and passed to a perforation unit 18, where small perforations are pressed into the extruded dough ribbons. Thence, the dough ribbons are transported, each suspended by its own structural integrity, to a ribbon conditioner unit 20, where the ribbons of dough are conditioned and laminated together. The laminated dough ribbon then proceeds to a to a cutter unit 22 where the ribbon is cut into the desired shapes that are to be the precursor to the three dimensional snack piece, for example into disks for expanding later into spheres. The cutter unit 22 produces shaped pieces, but the "off cuts" between the shaped pieces must be separated out. These are sent to a regrind unit 32 and recycled back to the preconditioner 14 for incorporation into dough. The shaped pieces proceed and are conveyed to a shaker dryer unit 24, for drying while shaking to minimize adherence of the shaped pieces to each other. From this shaker dryer, the dried shaped dough pieces proceed to a short dryer unit 26, and then to a finishing dryer unit 28. After finish drying, the product may be cooled in cooling unit 30 to produce a dried product suitable for storage, until needed when it can be cooked by baking or frying, to cause expansion of the piece into a three dimensional shape.

SUMMARY

An exemplary embodiment provides an apparatus for continuously separating a ribbon of uncooked dough into separated pieces, where the pieces include shapes previously embossed into the ribbon of dough. The apparatus includes a pair of rotating rollers spaced apart for receiving uncooked dough comprising a ribbon of dough there between. A first of the pair of rotating rollers has a pattern (or patterns) embossed on a surface thereof, and is configured to emboss the ribbon of dough with the pattern(s). The surface embossing and the spacing between the rollers maintains the structural integrity of the embossed ribbon of dough such that embossed dough pattern does not separate from the ribbon to any appreciable extent, if at all. The apparatus has a first arm spaced apart from and parallel to a second arm, to receive between the arms an embossed dough ribbon from the pair of rollers. Each of the arms rotate about a central axis of the respective arm. The first and second arms are located directly beneath the pair of rollers to receive the embossed dough ribbon exiting from between the rollers. A plurality of spaced apart fingers extend outward from each of the arms such that a first plurality of fingers extending from the first arm are interposed between a second plurality of fingers of the second arm as the arms rotate. The fingers are configured to contact, without sticking to the dough, and tear an embossed ribbon of dough into dough pieces having the shapes that were embossed in the dough ribbon. A dough pieces receptacle is located beneath the spaced fingers to receive the dough pieces that were separated by the apart fingers.

Optionally, the first and second plurality of spaced apart fingers extend radially from each of the respective first and second arms.

Optionally, the first plurality of fingers are longitudinally spaced apart along a length of the first arm.

Optionally, the first outward extending ends of the first plurality of fingers and second outward extending ends of the second plurality of fingers extend past each other and rotate past each other, as the first and second arms rotate, to thereby tear and separate a dough ribbon interposed between the first and second arms into dough pieces.

Optionally, the dough pieces receptacle comprises an inlet to an air conveyor, the air conveyor receiving separated pieces from the dough pieces receptacle located beneath the spaced fingers and conveying the dough pieces to a shaker dryer.

Optionally, the shaker dryer is configured to partially dry the separated dough pieces and thereby cause the separated dough pieces to fracture into emboss-patterned dough pieces reflecting the pattern of the first of the rotating rollers.

Optionally the apparatus further includes a size separator configured to separate emboss-patterned dough pieces from fragments of dough.

Optionally a second roller of the pair of rollers has a smooth surface lacking an embossing pattern.

Optionally, the first roller of the pair of rotating rollers has a pattern embossed on a surface thereof comprising a repeating pattern of identical pattern shapes (or different pattern shapes), surrounded by upstanding walls that are configured to emboss a dough ribbon by extending into a dough ribbon without cutting completely through the dough ribbon.

Another exemplary embodiment provides a continuous process of making a plurality of dough pieces having a two dimensional shape puffable to a three dimensional shape. The continuous process has several steps, including continuously extruding ribbons of an uncooked dough; laminating the dough ribbons into a laminated dough ribbon; and continuously embossing a series of shapes into the laminated dough ribbon, while maintaining integrity of the embossed laminated dough ribbon. Alternatively, the step of laminating the ribbons of dough can be omitted, and a single ribbon of dough may be extruded for embossing of designs therein. In addition, the process continuously mechanically tears dough pieces that have embossed shapes from the embossed laminated dough ribbon; and continuously dry the dough pieces in a shaker-dryer to produce patterned shapes corresponding to the embossed series of shapes and interstitial dough fragments. The process further includes continuously separating the patterned shapes from the interstitial dough fragments.

Optionally, the process further includes, after the step of extrusion, perforating the extruded dough ribbons.

Optionally, the step of mechanically separating is followed by a step of air-conveying the separated dough pieces, before the step of drying.

Optionally, the step of embossing includes embossing by feeding the single or laminated dough ribbon between a pair of rollers, one of the pair of rollers having an embossing surface pattern, the surface pattern applying a corresponding pattern to the laminated ribbon.

In an exemplary embodiment, the step of mechanically tearing the laminated embossed dough ribbon includes feeding the laminated (or single) embossed ribbon between a pair of rotating arms, each having fingers extending outward to touch and tear the embossed laminated (or single) ribbon.

Optionally, the process further includes cooking the separated patterned shapes to produce three dimensional snack pieces.

Optionally, the process further includes recycling of the interstitial dough fragments arising from between the patterned dough pieces by grinding the interstitial dough fragments and adding the ground interstitial dough fragments to a raw dough mixer for subsequent extruding into ribbons of dough.

Optionally, the step of embossing includes pressing upstanding walls surrounding pattern shapes of a roller into the dough ribbon to produce an embossed patterned laminated (or single) dough ribbon, while maintaining structural integrity of the embossed patterned in the dough ribbon.

In an exemplary embodiment, the step of mechanically tearing the embossed dough ribbon includes tearing the embossed patterned laminated (or single) dough ribbon into dough pieces using rotating fingers extending outward from a pair of opposed rotating arms to tear the embossed laminated (or single) ribbon, the dough pieces having one or more embossed shapes held together by interstitial dough.

Optionally, the process further includes the step of drying is includes drying the dough pieces to from about 11 to about 13 wt. % moisture.

Optionally, the step of embossing includes embossing a series of repetitive identical or different shapes, a shape of each of the series of repetitive shapes selected to maximize a surface area of the laminated ribbon reflecting the shape, and minimize a surface area of the laminated ribbon extending between embossed shapes.

BRIEF DESCRIPTION OF THE DRAWINGS

The foregoing aspects and many of the attendant advantages, of the present technology will become more readily appreciated by reference to the following Detailed Description, when taken in conjunction with the accompanying simplified drawings of exemplary embodiments. The drawings, briefly described here below, are not to scale, are presented for ease of explanation and do not limit the scope of the inventions recited in the accompanying patent claims.

DETAILED DESCRIPTION

The following non-limiting detailed descriptions of examples of embodiments of the invention may refer to appended Figure drawings and are not limited to the drawings, which are merely presented for enhancing explanations of features of the technology. In addition, the detailed descriptions may refer to particular terms of art, some of which are defined herein, as appropriate and necessary for clarity.

The term "structural integrity" as it pertains to a ribbon of extruded dough means that the dough ribbon structure, even when perforated, laminated, and embossed with a pattern, does not fail by breaking into pieces, but maintains a ribbon structure that can be continuously processed as a ribbon.

The term "three dimensional" as it applies to snack pieces means that the snack pieces have expanded during a cooking operation from a shape that is "flat" when uncooked. For example, a flat disc of dough of finite thickness, which in conventional mathematics is understood as three dimensional, is referred to herein as "two dimensional," while the cooked disc that has expanded into a rounded spherical shape is referred to herein as three dimensional. Accordingly, these terms are used in this manner for ease of explanation.

While the present description describes the processing of laminated ribbon of dough, it should be clear that a single ribbon of dough can also be so processed by omitting the step of dough ribbon lamination. Accordingly, the description herein, with this exception, applies to both processing of single ribbons as well as laminated ribbons of dough.

In the manufacturing processes described above with reference to FIG. 1, where an extruded ribbon of expandable dough is laminated then cut into shapes, there is a significant amount of "waste" from the dough that is present between the patterned shapes that are cut from the dough ribbon. This "waste" must be recovered by recycling, which reduces throughput on the production apparatus. Moreover, the amount of cut patterned shapes is reduced, so that also contributes to reduction of product throughput per unit time on the production apparatus. Accordingly, in order to reduce the cut off waste to be recycled, and to improve the amount of product, it is proposed to develop and select shapes (particularly repetitive shapes) that nest closely together with minimal potential interstitial dough between the repetitive shapes. In addition, desirably there should be a mechanism to uniformly and continuously produce these repetitive shapes on a ribbon of dough that is in continuous motion throughout the process. Moreover, there should desirably be a mechanism to continuously separate the desired shapes from dough ribbon, in such a manner as to avoid "clumping" of the dough as separated patterned dough shapes are separated from each other and fall under gravity onto a conveying apparatus. The conveying apparatus desirably is of a kind that also minimizes dough pieces clumping together as the pieces are conveyed to an oven for drying into individual patterned dough pieces that can be stored and/or cooked to create three dimensional snack pieces.

Briefly, an exemplary embodiment includes, among other features, an apparatus that continuously extrudes ribbons of dough, continuously perforates the dough ribbons, and continuously laminates the perforated dough ribbons. The apparatus passes the laminated ribbon between a pair of rollers, where the laminated ribbon is continuously embossed with a patterned shape that is on the surface of one of the rollers. The roller's surface embossed pattern and the spacing between the rollers maintains the structural integrity of the embossed ribbon of dough as it moves through the apparatus. The apparatus includes two spaced apart rotating arms, which each have a plurality of outwardly extending fingers, to continuously receive the embossed dough ribbon between the arms such that the ribbon is in contact with the plurality of fingers. The plurality of fingers extend outward and are disposed at intervals along the length of each of the arms. The fingers are configured to tear the dough, without sticking, into dough pieces each dough piece reflecting one or more of the shapes embossed in the dough ribbon. The dough pieces continuously fall under gravity into a dough pieces receptacle, which may be an inlet to an air conveyor. The air conveyor continuously conveys the dough pieces to a shaker dryer, where these pieces are dried. During shaking and drying, the patterned pieces separate from interstitial dough fragments. The dried patterned shaped pieces are continuously separated in a shaker sieve by sizing from the interstitial dough pieces and are routed to storage and/or cooking for expansion to snack pieces or "pellets." These are 3D snack pellets in the case of a laminated dough ribbon substrate. The relatively small amount of interstitial dough fragments are recycled from the shaker sieve fines to regrinding for incorporation into the dough, and extrusion into ribbons.

Figure 2:
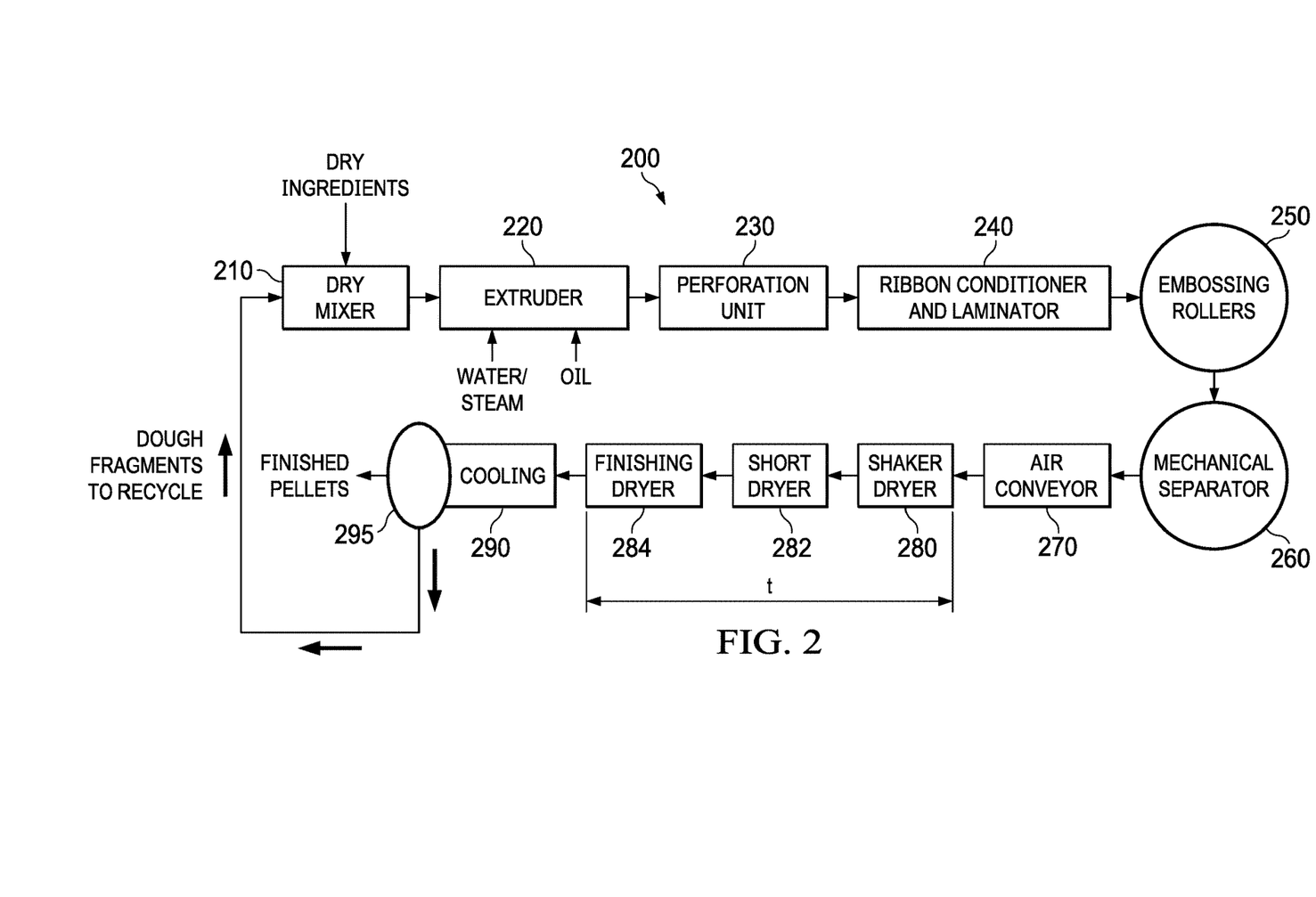
FIG. 2 is a block process flow diagram depicting an exemplary embodiment of the present technology including the embosser unit and the mechanical separation unit according to the present invention.

Referring to FIG. 2, an exemplary embodiment of a continuous process and apparatus 200 is presented in block diagram format. Dry ingredients to make an expandable dough are added to a dry mixer and the mixed dry mix is then routed to a screw extruder unit 220 where, by addition of water and oil, an extrudable dough is formed. The dough is extruded into 2 ribbons, although more ribbons could be used, and the dough ribbons are charged to a perforation unit 230. This unit 230 typically has a pair of rollers that rotate continuously as a dough ribbon passes through between the rollers that have surfaces designed to make fine perforations in the ribbons. Typically, the perforations are of uniform size and shape such that the ultimate cooked product has an aesthetically pleasing appearance as well as a pleasing texture. The ribbons of dough move continuously to a ribbon conditioner unit 240 where the dough ribbons travel between rollers and thereby treated, while moisture content is reduced. The conditioned ribbons of dough are then laminated, a step wherein the ribbons are laminated together between a pair of rollers. Note that in the case of single-ribbon processing, this lamination step is omitted. (This description, to avoid unnecessary repetition, will refer mainly to the laminated ribbon as the substrate.) After lamination, the laminated ribbon moves continuously to an embosser roller unit 250 where the laminated ribbon is embossed with a pattern transferred to it by a roller with a patterned surface, as explained in more detail here below. The embossed laminated ribbon, now having a series of patterns embossed on its surface, preferably but not necessarily repetitive patterns, travels, preferably but not necessarily, under gravity to a mechanical separator unit 260. In the mechanical separator 260, as explained in more detail here below, the embossed ribbon is fed between a pair of counter rotating arms and subjected to tearing action by fingers extending from each of the arms, as described in more detail here below, with respect to FIGS. 5A and B. The tearing action breaks the ribbon into dough pieces where each dough piece includes one or more embossed pattern. For example, if the embossed pattern is a repetitive pattern of oval shapes, then the pieces randomly may include one, two, three or more oval shapes held together by interstitial dough, as described in more detail here below with respect FIGS. 6A-6C. The dough pieces fall under gravity into a dough receiving receptacle, which may be an inlet of an air conveyor 270. The air conveyor 270 transports the dough pieces at speed, and minimizes sticking together ("clumping") of the dough pieces to a shaker dryer unit 280. Here the dough pieces are both shaken and heated to a drying temperature, of about 70-90 C. In succession, the drying dough pieces are continuously charged to additional drying stages in a short dryer 282 and a finishing dryer 284 to achieve a moisture content of at least about 9-13 wt. % for stability. The drying steps may in total extend for a total time t of about 3.5 to about 4 hours. The dried dough pieces are then cooled in a cooling unit 290. After the cooling unit 290, the cooled dough pieces, now separated more or less completely into patterned pieces and interstitial dough fragments that were located between the embossed patterned dough pieces. These can be separated by a sifter unit 295, which separates using sieve sizes, for example, and can also be separated at various other points in the process, as illustrated. The interstitial fragments of dough are removed for recycle: regrinding and adding back to the dry mixer 210, as shown.

Figure 3:
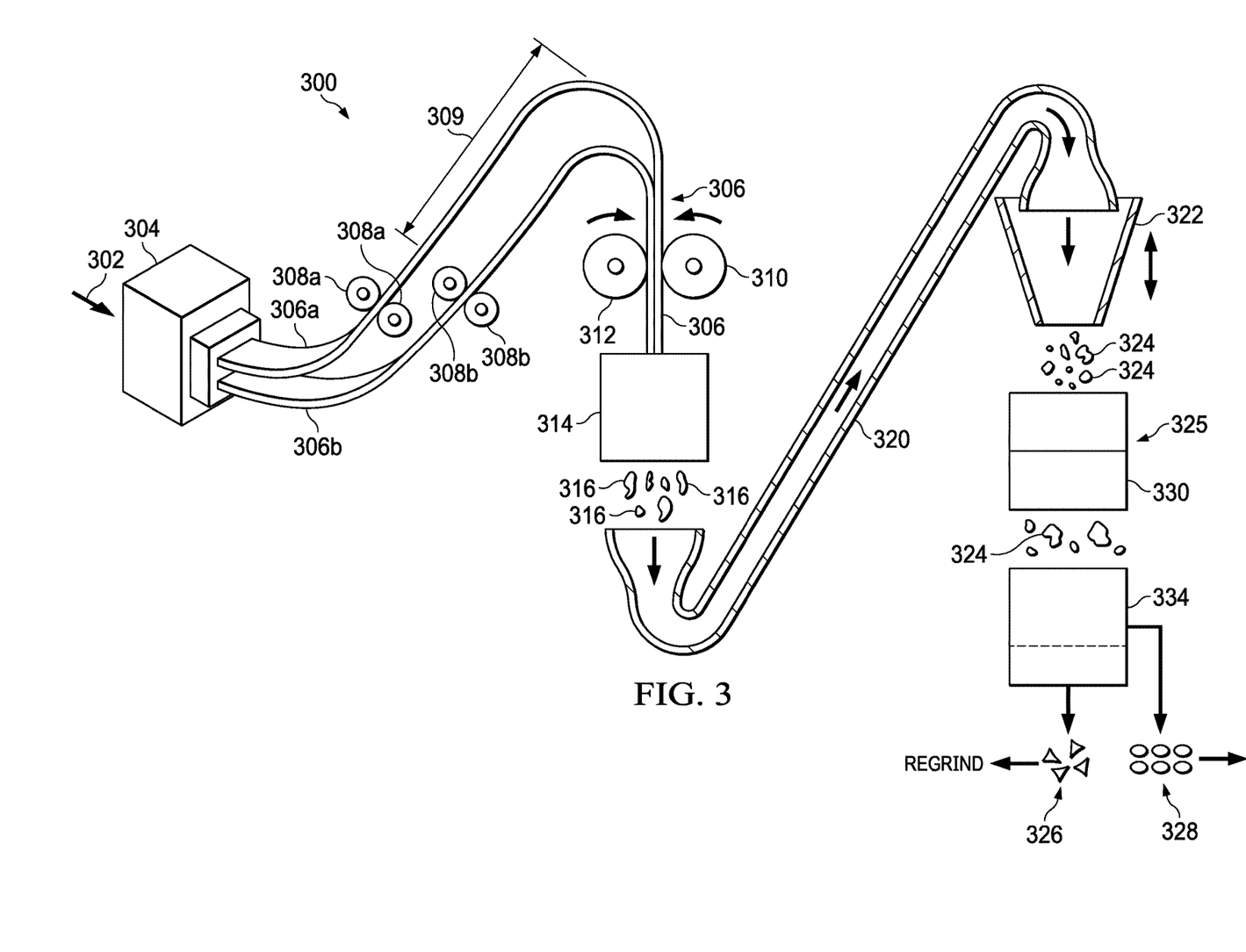
FIG. 3 is an exemplary process flow diagram according to the present invention depicting the dough ribbon path while being maintained by its own structural integrity, being mechanically separated into pieces, and pieces being conveyed to a shaker-dryer.
Figure 4:
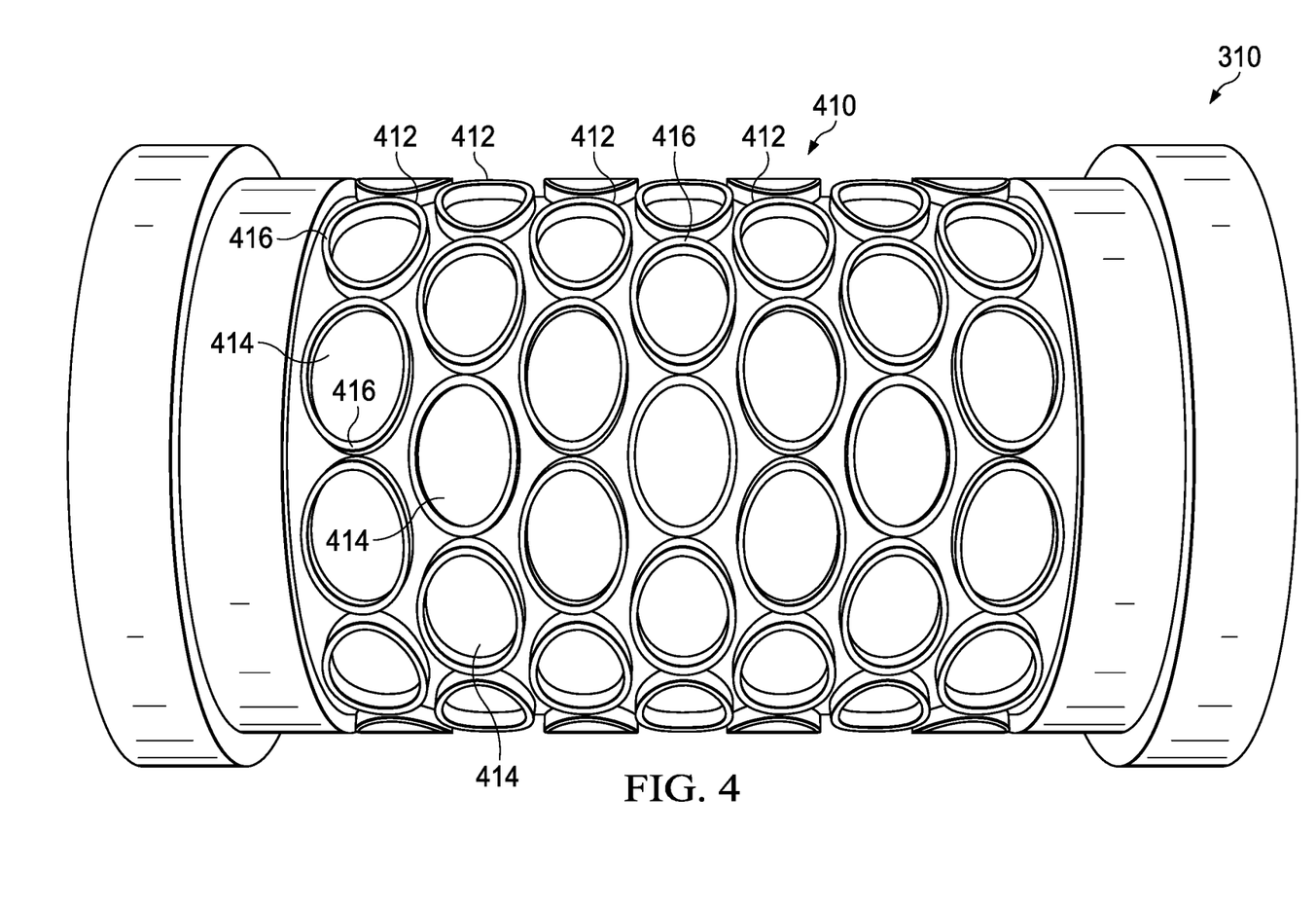
FIG. 4 is an illustrative exemplary embodiment of a surface of an embossing roller, according to the present invention.

Referring to FIG. 3, a simplified flow diagram depicting some of the process steps and units of an exemplary continuous process and apparatus 300. In this illustration, dry mix 302 is charged to an extruder 304 Two dough ribbons 306a and 306b are produced and travel as illustrated, unsupported, to between a pair of perforating rollers, 308a and 308b, respectively, where each ribbon 306a, 306b is perforated. These perforations later result in a pleasing appearance imparting a lacey look to the final pellets made, and provide a possibility of a liquid or dip or seasonings entering into the pellet, if it is a 3D pellet. From the perforating rollers, the dough ribbons travel continuously though a conditioning zone 309, where through continuous travel the perforated ribbons are conditioned to a desired moisture content. The two ribbons, 306a and 306b, are then aligned to be coextensive, and brought into interfacial contact to lightly adhere to each other to form a laminated ribbon 306. The laminated ribbon 306 then passes between a pair of continuously rotating rollers 310 and 312 where the ribbon is continuously embossed. One of the rollers 312 has a plain, un-patterned, smooth surface. The other roller 310 is illustrated in FIG. 4, which shows a roller 310 having a patterned surface 410. Each pattern 414 includes surrounding upstanding walls 412 that define the pattern, which in this non-limiting example is an oval shape. The walls 412 are sized such that, along with the gap set between the rollers, the walls outward ends 416 do not press completely through the laminated ribbon, but press deeply into the laminated dough ribbon to create an embossed pattern while maintaining the structural integrity of the ribbon. The pattern of roller 310, in this example is repetitive and has an oval shaped pattern that continues in an unbroken series across its surface. Of course, this is exemplary and other shapes are also useful. The shapes need not be identical on a particular roller, but can include patterns of different shapes on the patterned surface. Preferably, but not necessarily, the shapes, whether identical or differing from each other, are selected to minimize interstitial spaces between the patterns. This minimizes interstitial dough between the patterns which has to be recycled. Thus, in the case of the exemplary oval shaped patterns, the ovals are shaped and sized and juxtaposed relative to each other so as to minimize the space between the ovals, which become interstitial dough in the embossed ribbons, and that end up as "waste" to be recycled. In exemplary embodiments, the interstitial spaces and dough may be reduced to about 20% of the ribbon surface. In other words, 80% patterned product with 20% recycle.

Figure 5A:
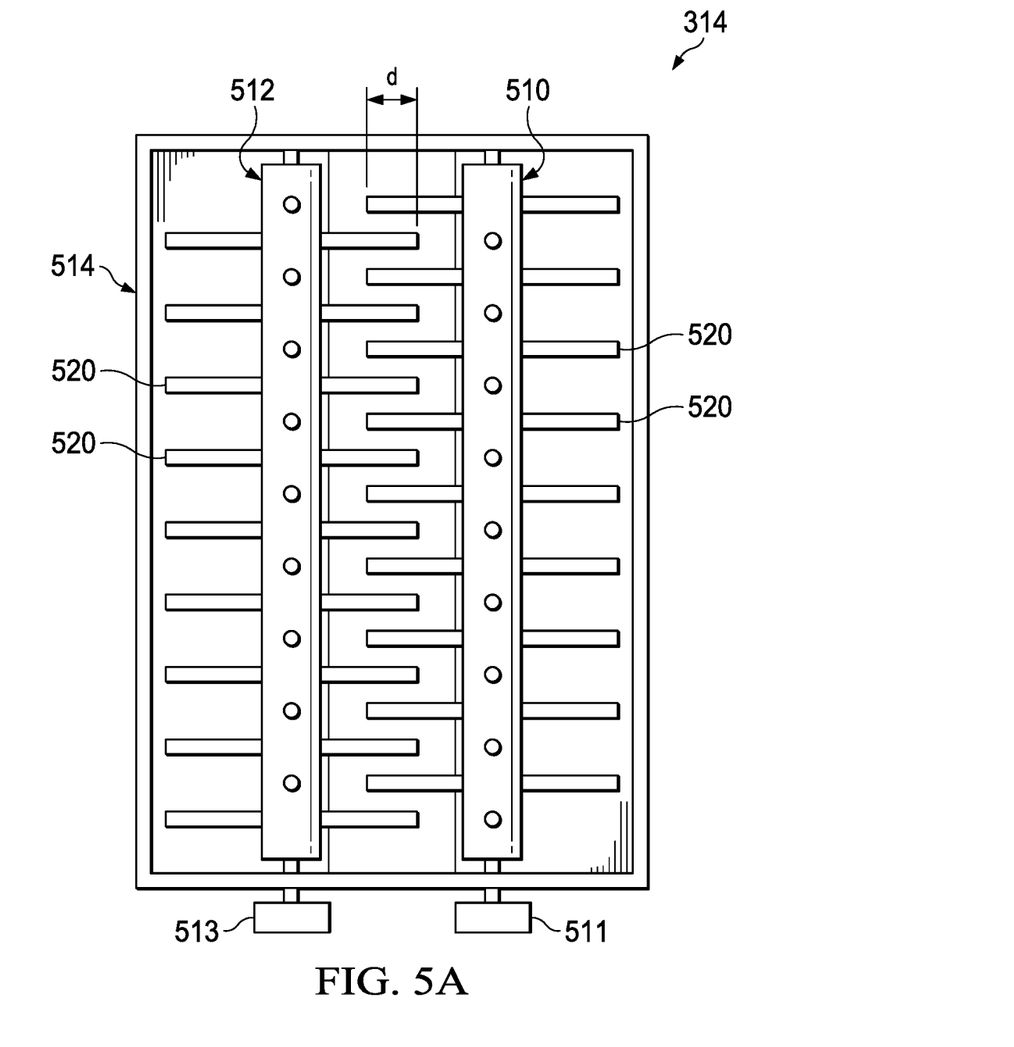
FIG. 5A is an illustrative top view of an exemplary embodiment of a "finger separator" in accordance with the invention.
Figure 5B:
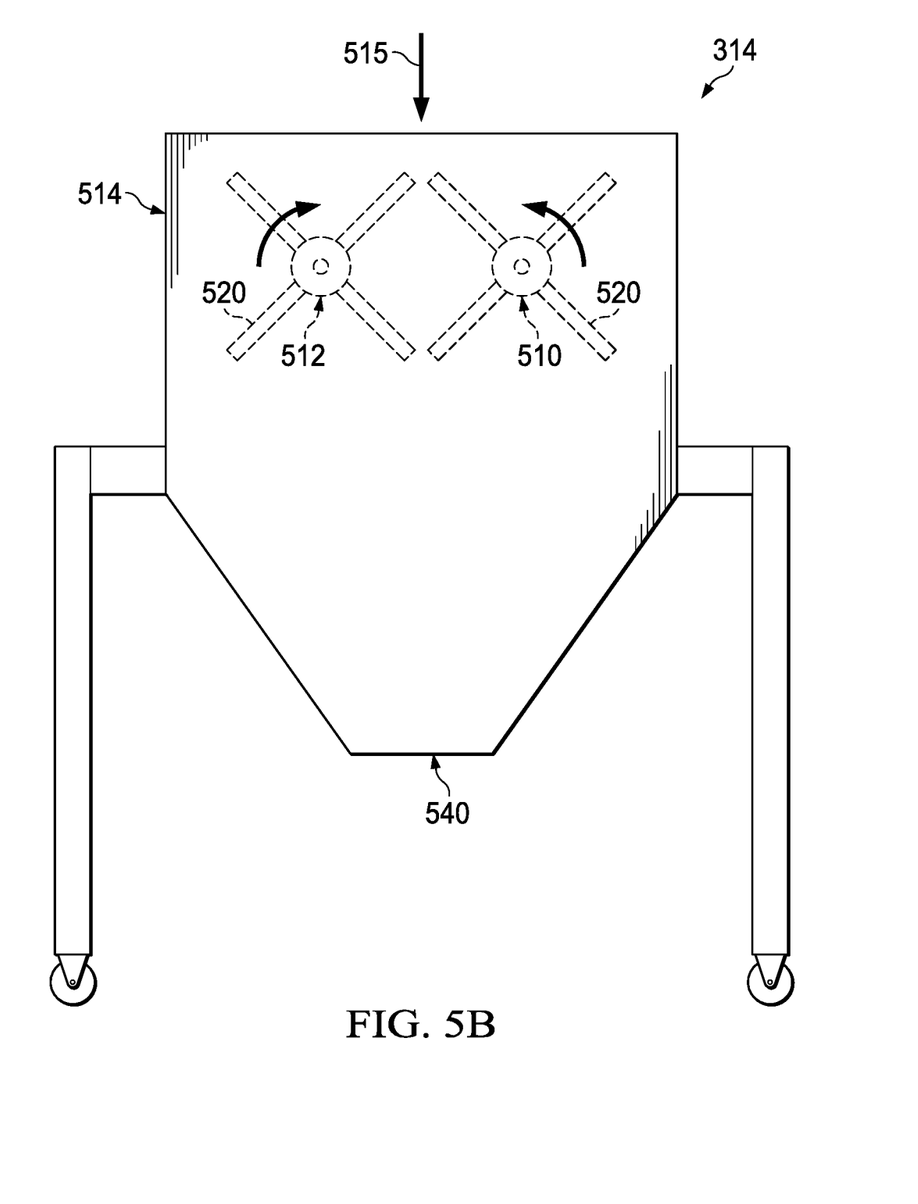
FIG. 5B is an illustrative cross sectional side view of an exemplary embodiment of the "finger separator" of FIG. 5A.
Figure 6A:
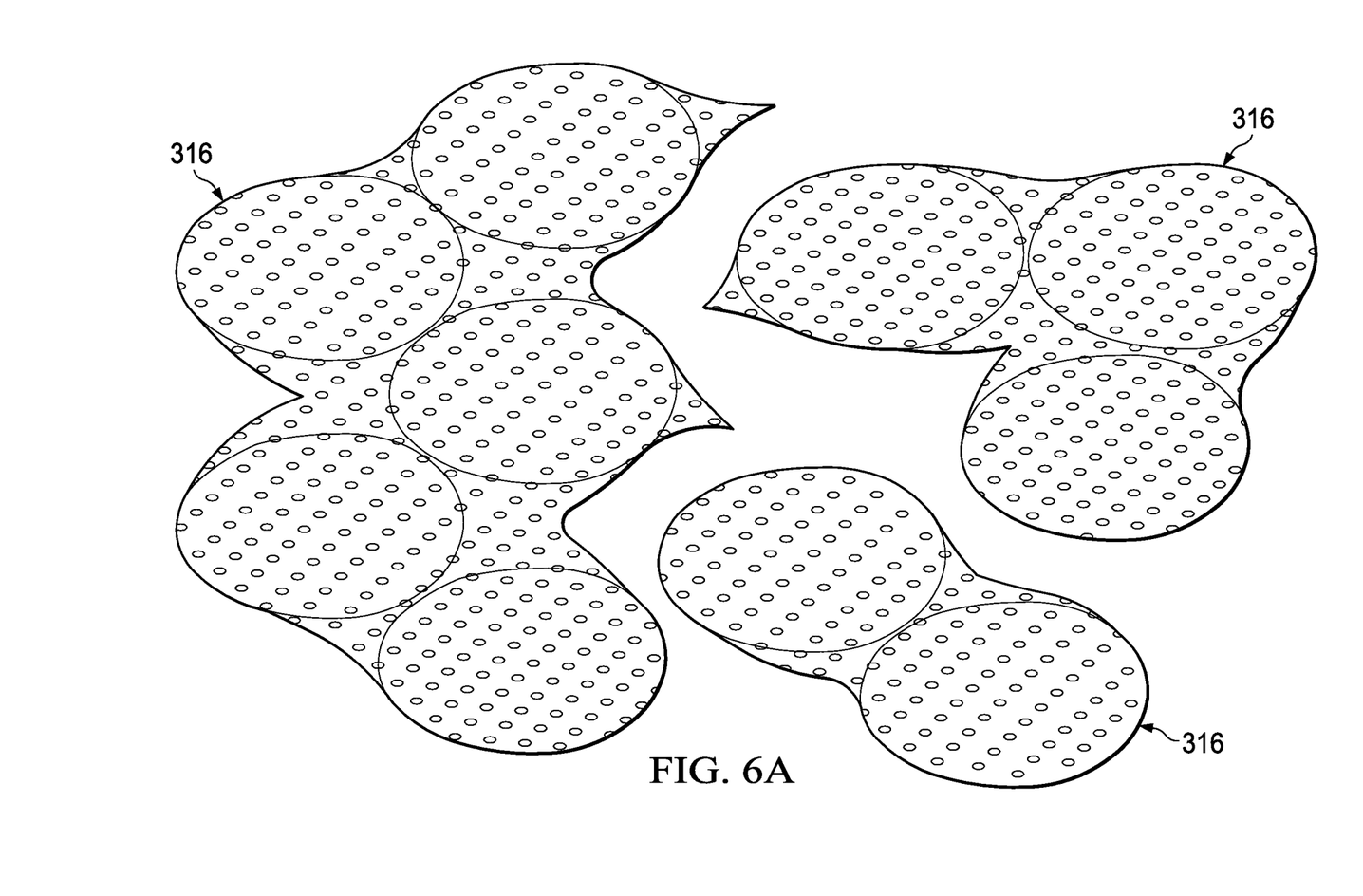
FIG. 6A is an illustration of exemplary pieces of dough at the exit of the dough separator.
Figure 6B:
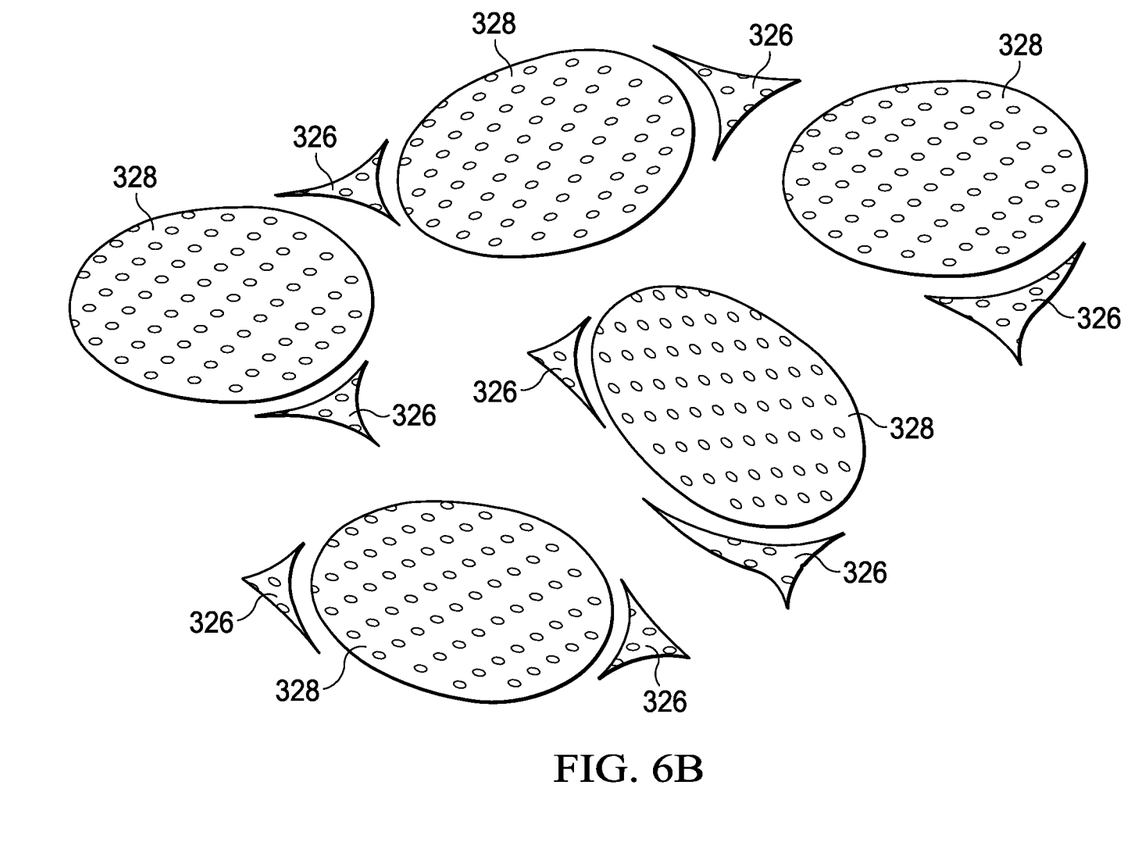
FIG. 6B is an illustration of exemplary patterned dough pieces and interstitial dough fragments.

The embossed laminated ribbon 306 then continuously enters a mechanical separator 314 where it is torn into dough pieces. The dough pieces at this stage are as illustrated in FIG. 6A, which show examples of patterned shapes (ovals in the example) held together by interstitial dough. The mechanical separator 314 is illustrated in FIGS. 5A and 5B. Referring to these figures, the mechanical separator includes a pair of arms 510, 512 each driven by a motor 511, 513, respectively, that extend parallel longitudinally, near the top of a housing 514 shaped with a conical base, in this example. Each of the arms 510, 512 rotates in a direction opposite to the other. The dough ribbon 306 is charged into the unit 314 as shown by arrow 515, in FIG. 5B. From FIG. 5A it is apparent that the fingers 520 overlap and interleave with fingers of the opposite arm by a length d. This overlap is selected such as to ensure tearing of the ribbon 306 into dough pieces 316 that include one or more patterned dough shapes. Pieces of dough 316 (in FIG. 3) fall into the hopper housing 514 and are carried down under gravity to an outlet 540.

Returning to FIG. 3, the dough pieces 316 exiting the outlet 540 (FIG. 5B) enter into an entrance of an air conveyor 320, are carried upward by air in the air conveyor 320 and are deposited into a shaker dryer 322. After a period of shaking while drying at a temperature in the range about 70 to about 90° C., the dried dough pieces 324 exit the base of the dryer 322. The dried dough pieces may be further dried in a one or more additional drying stages 325, and then cooled in a cooler 330. The dried dough pieces are at this stage separated into patterned pieces 328 and interstitial dough fragments 326, as illustrated more clearly in FIG. 6B. The patterned pieces are then separated from the smaller interstitial pieces in a size separator unit 332. This may include the use of sieves to separate the smaller sized/finer interstitial dough fragments 326 from the patterned dough pieces 328. The separated interstitial dough fragments 326 are reground and recycled for reuse in the dough making and extrusion area. The patterned dough pieces 328 can be stored or directly moved to further processing into snack food pellets.

Figure 6C:
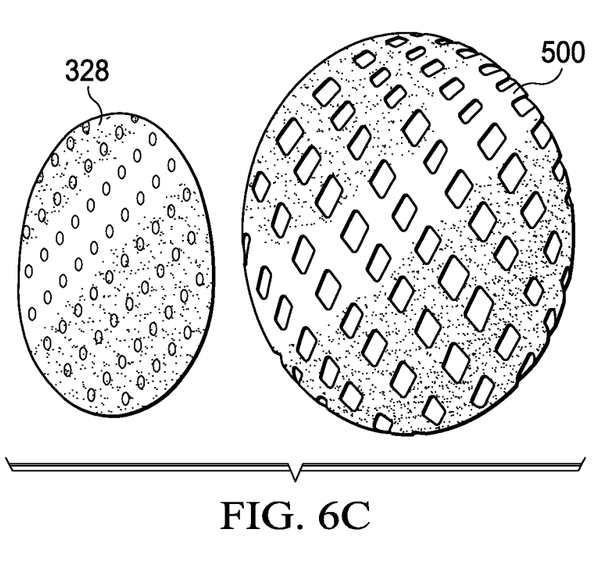
FIG. 6C is an illustration of an exemplary dough piece after being dried in a shaker dryer, as compared to the dough piece after being expanded to three dimensional form by cooking.

The patterned dough pieces 328 made from a laminated ribbon of dough, illustrated in the non-limiting example of FIG. 6C as an oval shape, may be cooked at some point and expanded to an ovoid 3D pellet shape 500. Of course, the patterned dough pieces 328 made from a single ribbon of dough can also be cooked and expanded to pellets. But these do not produce the 3D shape.

The use of the embossing roller as opposed to the prior art technique of cutting the dough ribbon into pattern shapes provides the advantage of flexibility of design because the pattern shape or shapes are easily set by the embossed roller surface. The upper ends 416 of the embossed roller walls 414 (FIG. 4) do not press completely through the dough ribbon so that wear and tear is minimized. And, by selection of the pattern, and juxtaposition of the individual pattern shapes relative to each other, the amount of recycle interstitial dough is reduced, and unit throughput of product is maximized. The separation of the patterned shapes from the embossed ribbon is facilitated by use of the mechanical separator, the use of the air conveyor, and the shaker dryer. This combination assists in maintaining the dough pieces as discrete individual pieces, and minimizes the possibility of the patterned shapes sticking together, and clumping, which causes more dough to be recycled. The mechanical separator supersedes the use of cutters and in combination with embossed rollers permits the possibility of a heretofore unobtainable variety of snack food pellet shapes and sizes.

While examples of embodiments of the technology have been presented and described in text and some examples also by way of illustration, it will be appreciated that various changes and modifications may be made in the described technology without departing from the scope of the inventions, which are set forth in and only limited by the scope of the appended patent claims, as properly interpreted and construed.

The invention claimed is:

1. An apparatus for separating a ribbon of uncooked dough into separated dough pieces, the apparatus comprising:
   a pair of rotating rollers spaced apart for receiving uncooked dough comprising a ribbon of dough there between, a first roller of the pair of rotating rollers having a pattern embossed on a surface thereof, and configured to emboss the ribbon of dough with the pattern, while maintaining structural integrity of the embossed ribbon of dough;
   a first arm spaced apart from and parallel to a second arm, each of the arms rotating about a central axis of the respective arm, the first and second arms located beneath the pair of rollers to receive between the arms an embossed dough ribbon from the pair of rollers;
   a first plurality of fingers extending radially outward from, and longitudinally spaced apart along a length of, the first arm;
   a second plurality of fingers extending radially outward from, and longitudinally spaced apart along a length of, the second arm such that as the first and second arms rotate, the first plurality and second plurality of fingers overlap and interleave each other in a longitudinal direction of the first and second arms to contact and tear an embossed ribbon into the dough pieces comprising shapes embossed in the embossed dough ribbon; and
   a dough pieces receptacle located beneath the plurality of spaced apart fingers to receive the dough pieces separated by the plurality of spaced apart fingers.

2. The apparatus of claim 1, wherein the dough pieces receptacle comprises an inlet to an air conveyor, the air conveyor receiving the separated dough pieces from the dough pieces receptacle located beneath the spaced fingers and conveying the dough pieces to a shaker dryer.

3. The apparatus of claim 2, wherein the shaker dryer is configured to partially dry the separated dough pieces and thereby cause the separated dough pieces to fracture into emboss-patterned dough pieces reflecting the pattern of the first of the rotating rollers.

4. The apparatus of claim 3, further comprising a size separator configured to separate emboss-patterned dough pieces from fragments of dough.

5. The apparatus of claim 1, wherein a second roller of the pair of rollers has a smooth surface lacking an embossing pattern.

6. The apparatus of claim 1, wherein the first roller of the pair of rotating rollers has the pattern embossed on a surface thereof comprising a repeating pattern of identical shapes, surrounded by upstanding walls that are configured to emboss the dough ribbon by extending into the dough ribbon without cutting completely through the dough ribbon.

* * * * *